W. L. DENHAM.
AEROPLANE.
APPLICATION FILED MAR. 27, 1918.

1,366,067.

Patented Jan. 18, 1921.
3 SHEETS—SHEET 1.

WITNESSES

INVENTOR
W. L. Denham,
BY
ATTORNEYS

W. L. DENHAM.
AEROPLANE.
APPLICATION FILED MAR. 27, 1918.
1,366,067.
Patented Jan. 18, 1921.
3 SHEETS—SHEET 2.
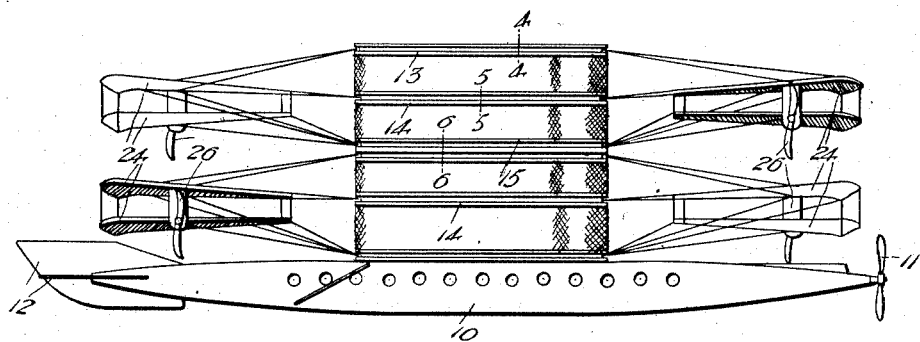
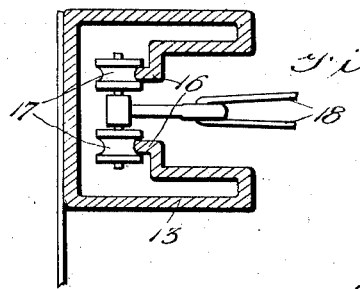
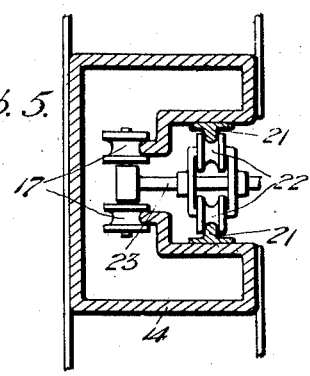
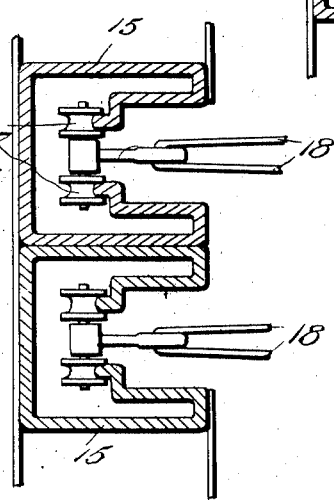
WITNESSES
INVENTOR
W. L. Denham,
BY
ATTORNEYS

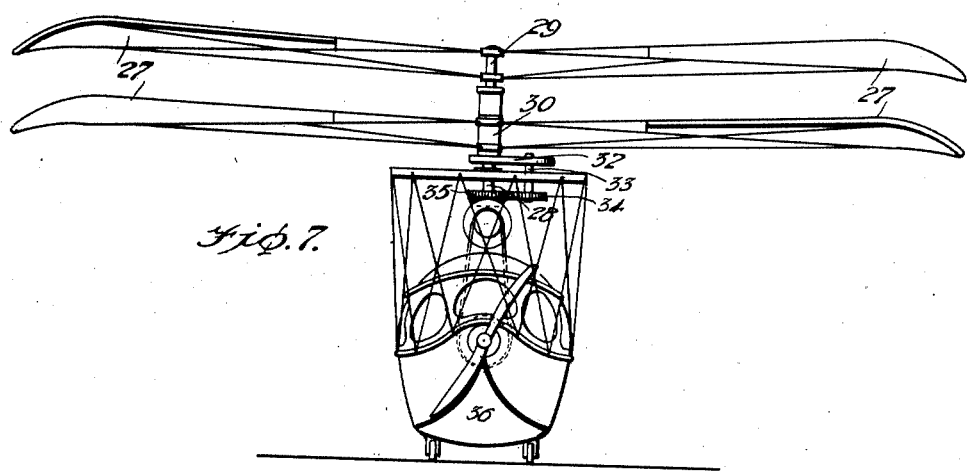
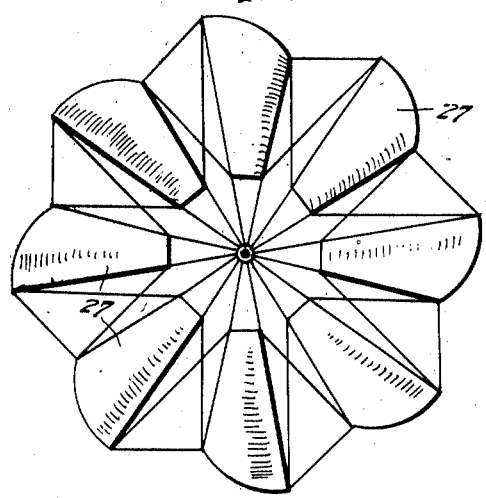
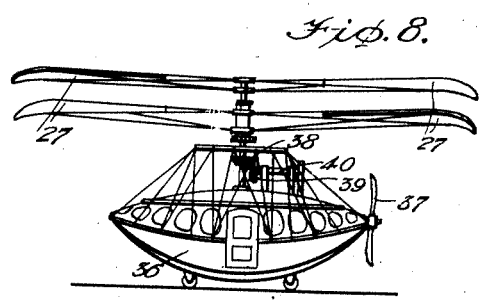
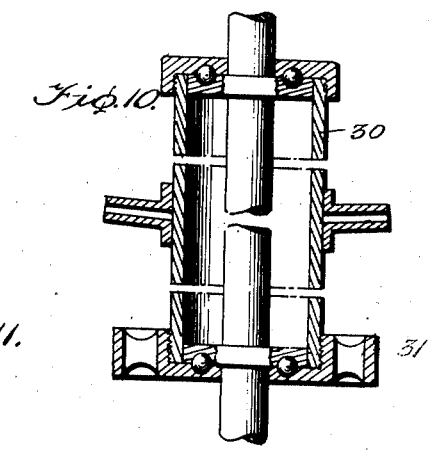
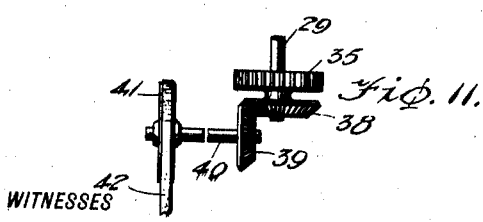

UNITED STATES PATENT OFFICE.

WILLIAM LESLIE DENHAM, OF BIRMINGHAM, ALABAMA, ASSIGNOR OF ONE-HALF TO HAMILCAR H. McNEILL, OF DEMOPOLIS, ALABAMA.

AEROPLANE.

1,366,067.        Specification of Letters Patent.      Patented Jan. 18, 1921.

Application filed March 27, 1918. Serial No. 224,953.

*To all whom it may concern:*

Be it known that I, WILLIAM L. DENHAM, a citizen of the United States, and a resident of Birmingham, in the county of Jefferson and State of Alabama, have made certain new and useful Improvements in Aeroplanes, of which the following is a specification.

My present invention relates generally to air ships, and more particularly to aeroplanes, my object being the provision of a machine embodying aeroplanes having rotation about an orbit or point stationary with respect to the body or fuselage of the machine in order to apply a direct lifting force and enable the machine to proceed to climb or descend upon an even keel, or in other words without tilting as required in the at present accepted type of aeroplane.

I propose to carry my invention out by the provision of a fuselage or body having means with respect to which the lifting wings are rotatable and disposed with respect to the body or fuselage in such manner that they will act upon the air during their rotation and may be adjustably manipulated to either lift the machine or hold it stationary or permit it to descend under control as desired.

An aeroplane of this type is capable of various constructions, certain of which are illustrated in the accompanying drawings forming a part of this specification, and wherein:—

Fig. 3 is a side elevation;

Figs. 4, 5 and 6 are detailed sections taken respectively on lines 4—4, 5—5 and 6—6 of Fig. 3;

Fig. 7 is a front elevation of a modified form;

Fig. 8 is a side elevation thereof;

Fig. 9 is a top plan view of one of the lifting planes;

Fig. 10 is a detail section through a certain portion of the mechanism, and,

Fig. 11 is a detail elevation of another portion of the mechanism.

Figure 1:
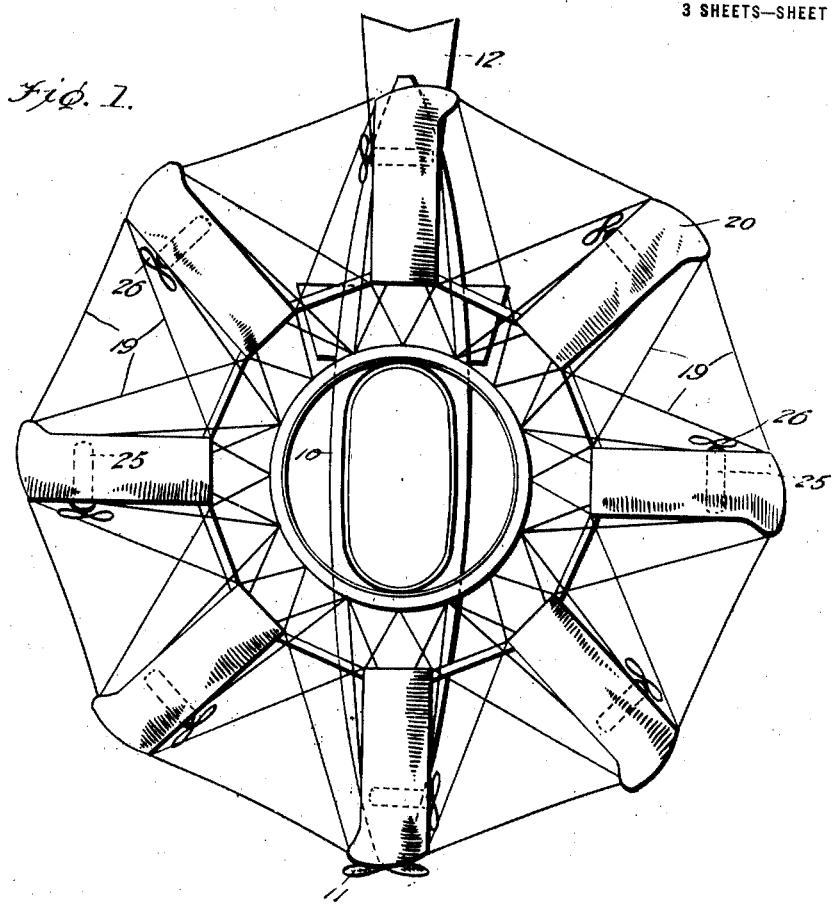
Figure 1 is a top plan view of the preferred form.
Figure 2:
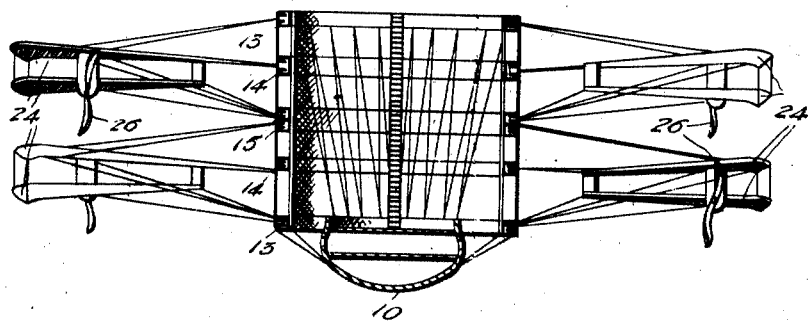
Fig. 2 is a vertical cross sectional view.

Referring now to these figures, and particularly to the form of the invention shown in Figs. 1 to 6, inclusive, I may utilize a body or fuselage 10, which in addition to its forward horizontal propeller 11, and its rear horizontal and vertical rudders 12 may be provided with an annular support intermediate its ends, including vertically superposed annular track members for instance as shown by the track members 13, 14 and 15 of Figs. 4, 5 and 6, inclusive, each of these track members being open entirely therearound with inwardly presented free edges 16 forming the tracks and for engagement by rollers 17 mounted at the inner ends of supporting guys 18, the latter of which assist the guy wire connections 19, as seen in Fig. 1, between the several wings or planes 20 of the rotary lifting propellers, in maintaining these propellers in the desired superposed relation of Figs. 2 and 3, and leaving the same free for rotation, in relatively opposite direction.

Each of the propellers is thus trussed to the annular upright support in such manner as to leave it freely rotatable, the central track 14 of each of the lifting propellers supporting upper and lower track pieces 21, as seen in Fig. 5, being engaged by rollers 22, carried by the intermediate supporting bars or rods 23 of the respective propeller.

As seen in Figs. 1, 2 and 3, each of the lifting propellers may be constituted by a series of radially outstanding wings or planes trussed in an annular series, each with their connections to the supporting rollers, and each of these radially outstanding wings may be formed of a pair of planes 24 having its own motor, generally indicated at 25, and its own driving propeller, as indicated at 26, the wings or planes of each of the lifting propellers being inclined in relatively opposite directions with their propellers 26 at opposite sides in order that the propellers may be driven in relatively opposite directions and thus offset any tendency to rotate the body or fuselage 10 about a vertical axis.

Instead of the arrangement just above proposed, I may utilize the details of Figs. 7 to 11, inclusive, wherein the lifting propellers include trussed outstanding radially disposed wings 27 inclined in relatively opposite directions, and of the single wing type, each of these propellers having its hub mounted upon a vertical shaft 28 to which the hub 29 of the upper propeller is secured, and upon which the hub 30 of the lower propeller is rotatable, as seen in detail in Fig. 10, where the hub 30 is shown, as provided with a lower pulley 31. This pulley may be connected by a belt 32 with the pulley of a vertical shaft 33, as seen in Fig. 7, the latter of which is connected by gears 34 and 35 to the shaft 29.

The shaft has a vertical rotatable support in the body or fuselage 36 provided with a horizontal propeller 37, and the shaft 29 has a gear 38 connected by a gear 39 with one end of a horizontal shaft 40 at the opposite end of which is a pulley 41 connected by a belt 42 with any suitable source of power such as the motor within the body 36, which also drives the propeller 37. Thus the lifting propellers of this form of the invention will be driven in relatively opposite directions just as in the form first above described, and like those lifting propellers of the first form consist of the radially outstanding planes inclined to act against the air in their rotation about a point fixed with respect to the body of the machine, and enable ascension and descension in a vertical line, and under control, as well as the maintenance of the machine stationary at any desired point.

It will be noted that neither the construction nor the operation of these lifting propellers tends to interfere with the normal functions of the other parts of the machine, for instance the vertical and horizontal rudders and the propeller or propellers for driving the machine through the air.

I claim:—

1. A machine of the type described consisting of a body having a propeller for driving the same horizontally and provided with an upright support intermediate its ends consisting of a plurality of superposed track members, rollers engaging the track members, horizontal lifting propellers, each consisting of a plurality of radially outstanding wings rigidly disposed and vertically spaced in pairs having truss connections with the said rollers, and means for rotating the said lifting propellers in relatively opposite directions.

2. A machine of the type described consisting of a body having a propeller for driving the same horizontally and provided with an upright support intermediate its ends consisting of a plurality of superposed track members, rollers engaging the track members, horizontal lifting propellers, each consisting of a plurality of radially outstanding wings rigidly disposed and vertically spaced in pairs having truss connections with the said rollers, means for rotating the said lifting propellers in relatively opposite directions, said latter means consisting of propellers each carried by a pair of the said wings, as described.

WILLIAM LESLIE DENHAM.